UNITED STATES PATENT OFFICE.

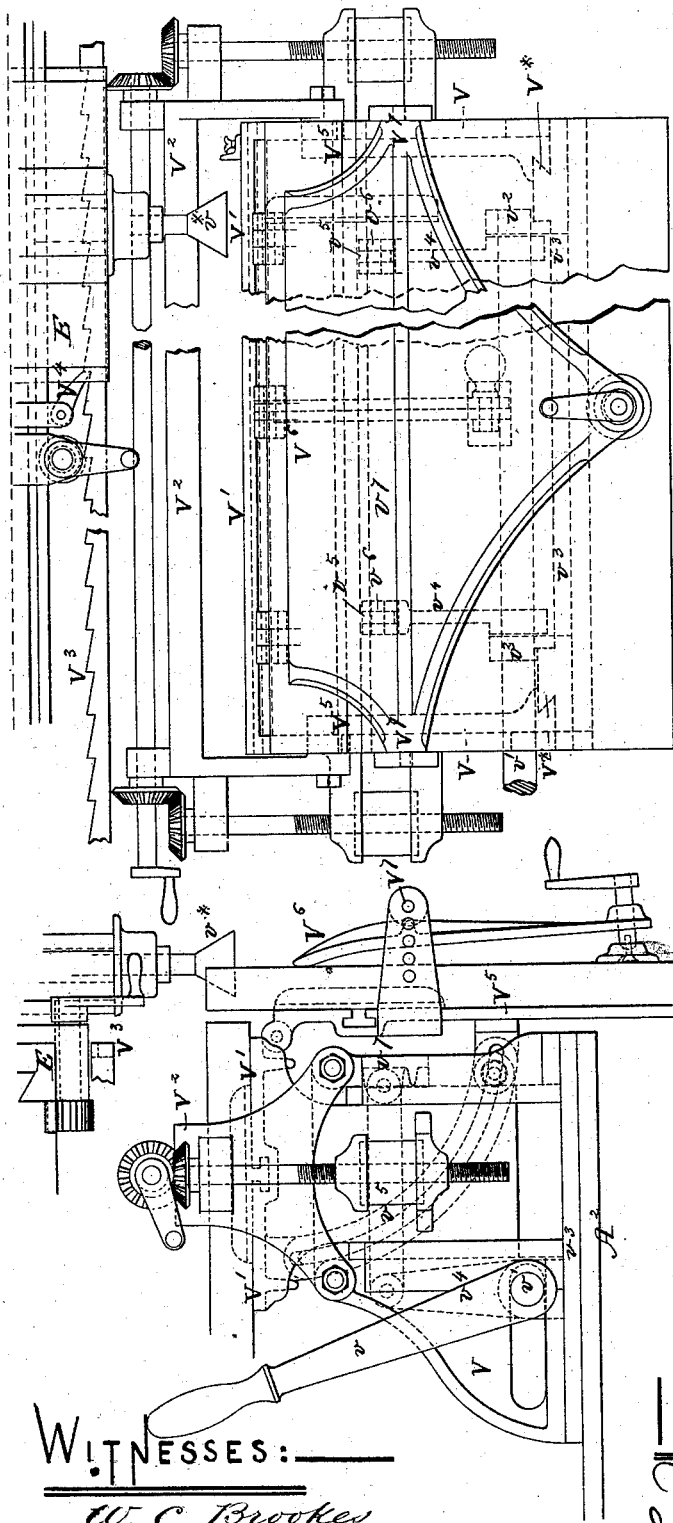

NICHOLAS JENKINS, OF NEW HAVEN, CONNECTICUT.

MACHINERY FOR DOVETAILING WOOD, STONE, &c.

SPECIFICATION forming part of Letters Patent No. 237,283, dated February 1, 1881.

Application filed January 11, 1879.

*To all whom it may concern:*

Be it known that I, NICHOLAS JENKINS, of the city and county of New Haven, in the State of Connecticut, have invented certain new and useful Improvements Relating to Machinery for Dovetailing or Grooving Pieces or Slabs of Wood, Stone, or other Analogous Material; and I do hereby declare that the following is a full, clear, and exact description thereof.

By my invention I am able to make open dovetails or blind dovetails not only for square corners, but for various other angles, for triangular, hexagonal, or octagonal forms.

The following is a description of what I consider the best means of carrying out the invention.

The accompanying drawings form part of this specification.

Figure 1 shows an end view, and Fig. 2 a front view, of apparatus constructed according to my invention.

In each of the views similar letters of reference are employed to indicate a corresponding part wherever they occur.

I employ a cutter of any suitable character which will make a dovetailed groove of proper size. My apparatus holds and presents the material, and gages how much it shall be fed along so as to have the several dovetail cuts at a uniform distance apart. I can make not only square corners, but various obtuse, and even acute, angles.

V V are uprights, bolted to the under side of the horizontal table V', and supporting such table with capability of sliding freely on guides V*, carried by a suitable table or support, $A^2$. The horizontal table V' is provided with a clamping-bar, $V^2$, above, and mechanism, as indicated, adapted to firmly hold down a piece or slab of material thereon and allow the edge of the piece or slab which is placed flush with the edge of the table to be excavated by the dovetailing-cutter v* above.

$V^3$ is a notched bar extending across the machine in the right position to receive a pawl, $V^4$, which is mounted on the cross-traversing carriage E of the cutting-machine, (not represented,) and is adapted to engage in succession with the several teeth in the bar $V^3$, which is carried by the main frame of the cutting machinery.

A proper gage is employed to determine the horizontal distance to which the table V' and parts connected therewith may be moved, and consequently the distance to which the several grooves may be excavated.

In operation, the cutter is lowered and the table V' is traversed forward, and a dovetail groove excavated at the proper distance apart in the end of the wood. Then the table V' is run back so that the material is removed from the cutter, and the carriage E, with its several connections, including the cutter, is moved horizontally until the pawl $V^4$ engages in the next notch, or any other desired notch. By this means the distance apart of the dovetail grooves is gaged. Then the table V' is fed forward again, and the second dovetail groove excavated, and the operation repeated.

$V^5$ is a leaf hinged to the table V', as shown, and capable of being set and firmly held at various inclinations, as required.

$V^6$ is a broad clamping-piece supported on a cross-shaft, $V^7$, and adapted to strongly clamp a piece of material on this inclined table or leaf $V^5$. This leaf $V^5$ is for ordinary square dovetailing, adjusted in an exactly vertical position. The material is held therein just high enough to allow its upper end to be scored across by the dovetailing-cutter. This hinged leaf and its clamp make it practicable to present another board and cause it to be treated at the same time with the one first described. The same shifting of the carriage E and its connections by the raising of the pawl $V^4$ produces the proper dovetailing cut, not only in the first piece of material, as described, but also in the other, which is to match with it.

The table V' (and part $V^6$ connected therewith) is moved backward and forward, when desired, by means of a handle-lever, $v$, affixed on the end of a rock-shaft, $v'$, carried in bearings $v^2$, supported by plate $v^3$, carried by the table $A^2$, or they may be formed on the table $A^2$ itself. To the rock-shaft $v'$ are attached arms $v^4$ $v^4$, which, by links $v^5$ $v^5$ and pin-joints $v^6$, are connected to a cross-bar, $v^7$, from the standards or uprights V. It will thus be seen that by moving the handle $v$ to the right or left the table will be correspondingly traversed.

When wood or other material is to be dovetailed together at the angle required for hexagonal, octagonal, or other work requiring angles differing from a right angle, the table $V^5$ is adjusted at the proper inclination, so that the score is produced across the wood by the dovetailing-cutter, not at a right angle with its plane, but at the required oblique angle. After the whole is completed, care being taken that the dovetailing grooves are as great or a little greater than the lands between, the two pieces of wood are taken from the machine, and on properly inverting one and applying them together, either with or without glue, shellac, or the like, the dovetailing joints may be driven forcibly together and made complete, and the boards will stand correctly at the required angle.

Modifications of this device may be made within wide limits by any competent mechanic. By changing the form of the cutters various other forms of grooves or cuts may be formed in pieces or slabs of wood or other material.

I claim as my invention—

1. The dovetailing-cutter $v^*$, in combination with the clamps $V^2$, as herein specified.

2. The dovetailing-cutter $v^*$, clamps $V^2$, and notched bar $V^3$, in combination with each other and with the pawl $V^4$, for gaging the spaces between the cuts, as herein specified.

3. The hinged leaf or table $V^5$, with its clamp $V^6$, for holding material firmly thereon, in combination with means for adjusting its inclination, and with a cutter, $v^*$, and clamp $V^2$, for holding the counter-piece, all adapted for joint operation, as and for the purposes herein specified.

In testimony whereof I have hereunto set my hand this 22d day of June, 1878, in the presence of two subscribing witnesses.

NICHOLAS JENKINS.

Witnesses:
W. COLBORNE BROOKES,
CHAS. C. STETSON.